(12) United States Patent  
Uchida et al.

(10) Patent No.: US 8,376,106 B2
(45) Date of Patent: Feb. 19, 2013

(54) DRIVING FORCE TRANSMITTING DEVICE

(75) Inventors: Noboru Uchida, Tochigi (JP); Masaki Takahashi, Tochigi (JP); Isao Hirota, Tochigi (JP)

(73) Assignee: GKN Driveline Japan Ltd., Tochigi, Tochigi (JP)

( * ) Notice: Subject to any disclaimer, the term of this patent is extended or adjusted under 35 U.S.C. 154(b) by 353 days.

(21) Appl. No.: 12/716,179

(22) Filed: Mar. 2, 2010

(65) Prior Publication Data

US 2010/0219036 A1 Sep. 2, 2010

(30) Foreign Application Priority Data

Mar. 2, 2009 (JP) .................................. 2009-047602

(51) Int. Cl.
F16D 27/115 (2006.01)
(52) U.S. Cl. ...................... 192/35; 192/84.7; 192/84.96
(58) Field of Classification Search .................. 192/35, 192/84.91, 84.6, 84.7, 84.96
See application file for complete search history.

(56) References Cited

U.S. PATENT DOCUMENTS

| | | | | | |
|---|---|---|---|---|---|
| 2,857,998 | A | * | 10/1958 | Harter | 192/84.96 |
| 3,327,822 | A | * | 6/1967 | Spencer | 192/84.92 |
| 3,327,823 | A | * | 6/1967 | Miller | 192/84.92 |
| 3,425,529 | A | * | 2/1969 | Hayashi | 192/84.941 |
| 5,551,546 | A | * | 9/1996 | Tabayama et al. | 192/84.96 |
| 6,578,684 | B2 | * | 6/2003 | Yamamoto et al. | 192/35 |
| 2007/0238567 | A1 | * | 10/2007 | Hirota et al. | 475/160 |
| 2008/0073170 | A1 | * | 3/2008 | Matsumoto | 192/84.7 |
| 2008/0251344 | A1 | * | 10/2008 | Ochiai et al. | 192/84.96 |
| 2009/0008207 | A1 | * | 1/2009 | Hirota et al. | 192/70.12 |
| 2009/0017982 | A1 | * | 1/2009 | Gasch et al. | 476/8 |

FOREIGN PATENT DOCUMENTS

| | | | |
|---|---|---|---|
| JP | 2000-240684 | | 9/2000 |
| JP | 2002-039216 | | 2/2002 |
| JP | 2008-261434 | | 10/2008 |
| JP | 2010159845 A | * | 7/2010 |
| JP | 2010174944 A | * | 8/2010 |
| JP | 2010203489 A | * | 9/2010 |
| JP | 2011099521 A | * | 5/2011 |
| JP | 2011102637 A | * | 5/2011 |
| JP | 2011144858 | * | 7/2011 |
| JP | 2011144858 A | * | 7/2011 |
| JP | 2011196504 A | * | 10/2011 |
| JP | 2011208739 A | * | 10/2011 |

* cited by examiner

*Primary Examiner* — Richard M. Lorence
*Assistant Examiner* — Lillian Nguyen
(74) *Attorney, Agent, or Firm* — Morrison & Foerster LLP

(57) ABSTRACT

A driving force transmitting device is comprised of a first rotary member, a second rotary member securely fit around the first rotary member, a third rotary member rotatably supported in the first and second rotary members for being engaged with a shaft, an anti-rotated solenoid slidably fit in a solenoid housing hollow defined by the second rotary member, and a friction clutch driven by the solenoid for transmitting torque between the first rotary member and the third rotary member.

15 Claims, 4 Drawing Sheets

DRIVING FORCE TRANSMITTING DEVICE

CROSS-REFERENCE TO RELATED APPLICATIONS

This application is based upon and claims the benefit of priority from the prior Japanese Patent Application No. 2009-047602 (filed Mar. 2, 2009); the entire contents of which are incorporated herein by reference.

BACKGROUND OF THE INVENTION

1. Field of the Invention

The present invention relates to a driving force transmitting device applied to conveyance means such as automobiles.

2. Description of the Related Art

An automobile is sometimes equipped with an electromagnetically operational driving force transmitting device by which torque transmission is controllably switched on and off. This device, however, requires a very powerful solenoid because great torque sufficient to drive the automobile acts on the clutch and engagement of the clutch must be achieved against this great torque.

To reduce required capacity of the solenoid, a pilot clutch may be used in combination with a main clutch. A solenoid with a relatively small capacity operates the pilot clutch to convert a part of torque into axial force that is powerful enough to engage the main clutch against the torque.

Related arts are disclosed in Patent Publications of Unexamined Japanese Patent Applications that are laid open under serial Nos. JP 2002-39216, JP 2000-240684 and JP 2008-261434.

SUMMARY OF THE INVENTION

Although a solenoid with a relatively small capacity may become applicable in a driving force transmitting device if a pilot clutch is used in combination with a main clutch, its entire structure inevitably becomes complex and bulky. A bulky device on a driveline is, needless to say, disadvantageous in view of energy efficiency.

An object of the present invention is to provide a compact driving force transmitting device without sacrificing its capacity.

According to an aspect of the present invention, a driving force transmitting device used for transmission of torque to a shaft is comprised of: a first rotary member including a cylindrical wall; a second rotary member being fixed with the first rotary member so as to define a housing chamber and including a radial wall, a boss portion axially projecting from the radial wall, a first jacket portion cylindrically extending from the radial wall, and a second jacket portion cylindrically extending opposite to the first jacket portion and being fit around the cylindrical wall, the first jacket portion in combination with the radial wall and the boss portion defines a solenoid housing hollow; a third rotary member rotatably supported in the first and second rotary members and drivingly engageable with the shaft; an anti-rotated actuator including a solenoid and a magnetic core disposed with a loose fit in the solenoid housing hollow; an armature housed in the housing chamber and disposed so that the armature, the radial wall, the boss portion, the core and the first jacket portion form a closed magnetic circuit around the solenoid; and a friction clutch held between the armature and the radial wall so as to frictionally transmit the torque between the first rotary member and the third rotary member.

DETAILED DESCRIPTION OF THE PREFERRED EMBODIMENT

Certain embodiments of the present invention will be described hereinafter with reference to the appended drawings. Throughout the specification, claims and the drawings, an axial direction means a direction along a rotation axis of a device at issue unless any other particular descriptions are given. The axial direction is generally correspondent to lateral directions of FIGS. 1 and 4.

A driving force transmitting device 1 in accordance with a first embodiment of the present invention is preferably used for transmission of torque generated by a power source such as a gasoline engine, a diesel engine and an electric motor to a shaft, but is of course not limited thereto.

Figure 1:
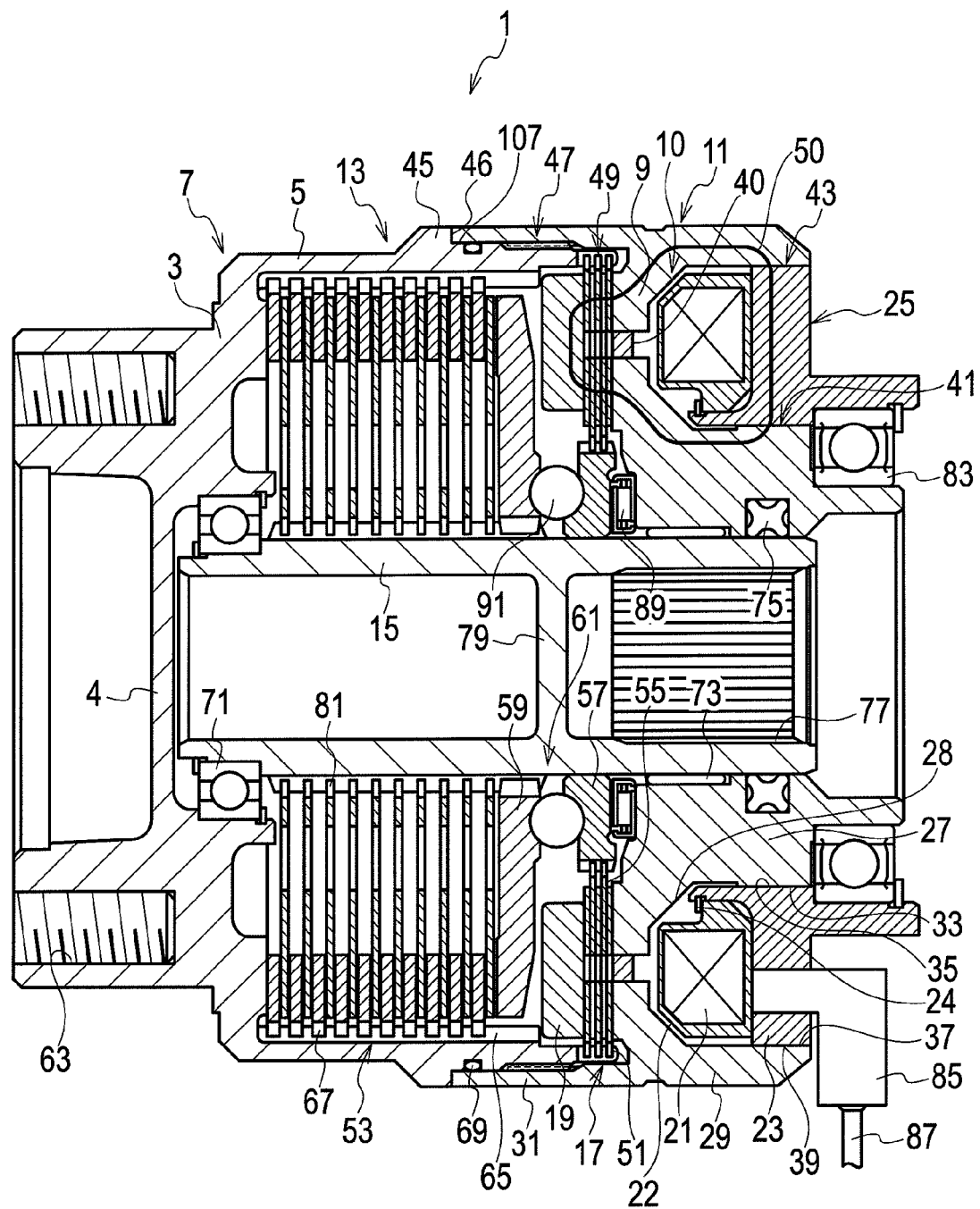
FIG. 1 is a cross sectional view of a driving force transmitting device according to a first embodiment of the present invention.

Referring to FIG. 1, the driving force transmitting device 1 is comprised of an outer rotary body 13, an internal rotary member 15 rotatably supported in the outer rotary body 13, an anti-rotated actuator 25 with an armature 19, and a pilot clutch 17 for primarily transmitting the torque between the outer rotary body 13 and the internal rotary member 15. The internal rotary member 15 is comprised of a splined inner face 77 to drivingly mate with the shaft (not shown) and contains a cam mechanism 61 for converting the torque transmitted via the pilot clutch 17 into axial force, and a main clutch 53 operated by the axial force generated by the cam mechanism 61 thereby secondarily transmitting the torque between the outer rotary body 13 and the internal rotary member 15.

The outer rotary body 13 is generally composed of a first rotary member 7 and a second rotary member 11 fixed together so as to define a housing chamber for housing internal members. The whole of them is made rotatable about an axis of the device. At least the second rotary member 11 among these members is, aside from a non-magnetic ring 40 fit therein, made of any magnetic material. The interior of the outer rotary body 13 is appropriately oiled for the purpose of lubrication.

The first rotary member 7, preferably formed in a single unitary body, is comprised of an end wall 3 substantially standing perpendicular to the axis and a cylindrical wall 5 extending from the end wall 3 in a generally cylindrical shape about the axis. A first end of the first rotary member 7, shown in the left of FIG. 1, has bolt holes 63 for drivingly mating with an external member, through which the torque is transmitted. In contrast, a second end shown in the right is, before mating with the second rotary member 11, opened for installation of the internal members. The center of the first end may be closed by a central wall 4 for the purpose of oil sealing within the outer rotary body 13.

Figure 2A:
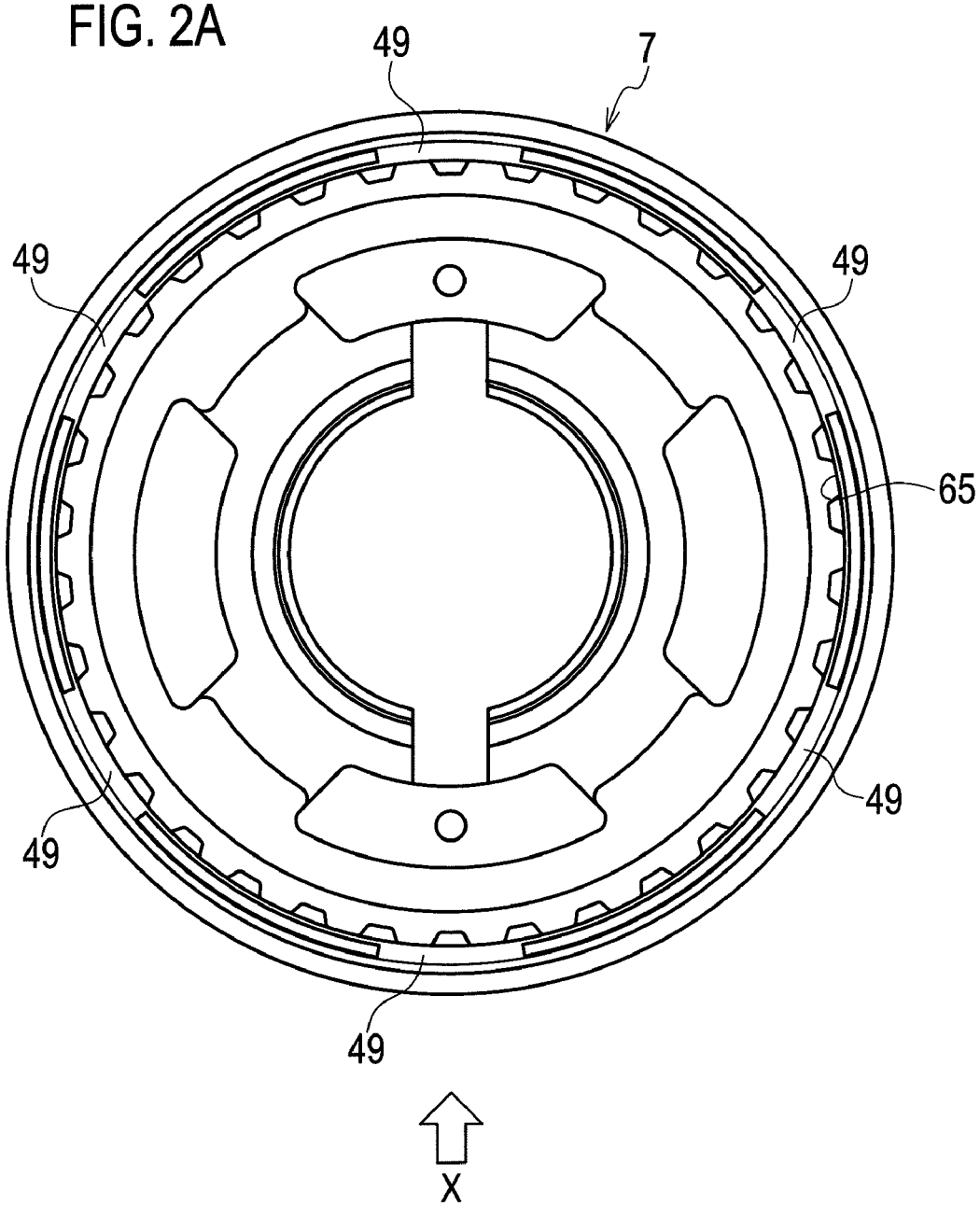
FIG. 2A is a side view of a first rotary member of the driving force transmitting device viewed from the right in the view of FIG. 1.
Figure 2B:
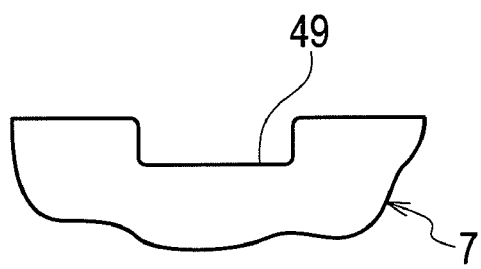
FIG. 2B is a plan view around dog-teeth of the first rotary member viewed along an arrow X of FIG. 2A.

Near the second end, as shown in FIG. 2B, the first rotary member 7 has axially projecting dog-teeth 49 for drivingly engaging with the pilot clutch 17. Preferably, the dog-teeth 49 are slightly laterally narrowed toward the second end. Resultant slanted side faces of the dog-teeth function as cams to generate axial force toward the second end when a difference in rotation is generated as a result of operation of the pilot clutch 17. This cam force in turn assists engagement of the pilot clutch 17.

The interior of the first rotary member 7 has splines 65 projecting inward for drivingly engaging with the main clutch 53. As clearly shown in FIG. 2A, the dog-teeth 49 are disposed outer than the splines 65. Therefore the diameter of the pilot clutch 17 can be made relatively large to generate sufficient force although the total dimension of the device 1 is kept relatively compact.

The second rotary member 11, preferably formed in a single unitary body, is comprised of a radial wall 9 generally perpendicular to the axis, and a boss portion 27 axially projecting around the center of the radial wall 9. The radial wall 9 is divided into inner and outer parts. A ring-like member 40 of any non-magnetic member, such as a stainless steel, copper or a copper alloy, securely fit in between the inner and outer parts. The ring-like member 40 magnetically separates the inner and outer parts of the radial wall 9 but structurally links them to be a single body. A first jacket portion 29 extends from an outer end of the radial wall 9 and is formed in a cylindrical form about the axis. A second jacket portion 31 also extends from the outer end to form a cylindrical form opposed to the first jacket portion 29.

The first jacket portion 29 in combination with the radial wall 9 and the boss portion 27 define a hollow in a form of a circular groove, which is adapted to house and hold the actuator 25. The bottom of the hollow may be formed in a flat shape but alternatively may have a conical wall 10 at its outer edge between the first jacket portion 29 and the radial wall 9. The opposite edge between the conical wall 10 and the boss portion 27 may further have a conical wall 28.

The second jacket portion 31 fits around the cylindrical wall 5 of the first rotary member 7. The cylindrical wall 5 may have a circular projection 45. A side face 46 of the projection 45 abuts on the end of the second jacket portion 31, thereby positioning the second jacket portion 31 in place. The cylindrical wall 5 and the second jacket portion 31 generally form a cylindrical outline of the outer rotary body 13.

Preferably, the cylindrical wall 5 and the second jacket portion 31 are correspondingly tapped and, by the tapped portions 47, the second rotary member 11 is fixed with the first rotary member 7. The tapped portions 47 have smaller diameters than an outer diameter of the first jacket portion 29. Or alternatively, any fixation means such as pins or bolts may be used for fixation therebetween. An O-ring groove is preferably formed on the cylindrical wall 5 under the second jacket portion 31 and an O-ring 69 is installed therein to prevent oil leakage. Or alternatively, any sealing member may be used. Still alternatively, the cylindrical wall 5 and the second jacket portion 31 are made in fluid-tight contact at a support portion 107 without a sealing member, or fused together after installation of the internal members.

The actuator 25 is formed in a ring shape and is rotatably housed in the solenoid housing hollow of the second rotary member 11. The actuator 25 is anti-rotated by pins or bolts fixed with an external stationary member. The actuator 25 is comprised of a solenoid coil 21 for generating magnetic flux, and a magnetic core 23 for inducing the generated magnetic flux toward the second rotary member 11.

The solenoid coil 21 may be formed in a simple ring shape such as a body of revolution of a rectangle but alternatively its outer edge may be cut off to form a conical surface 22, which is in a face-to-face relation with the conical wall 10 of the second rotary member 11.

The solenoid coil 21 is positioned in place relative to the magnetic core 23 by means of a snap ring 24 fixed with the magnetic core 23.

The solenoid 21 is electrically coupled with an external battery via a connector 85, a lead line 87 and a not-shown controller. The controller preferably controls current applied to the solenoid 21, thereby controlling frictional force of the pilot clutch 17.

The magnetic core 23 is disposed with a loose fit in the solenoid housing hollow of the second rotary member 11. Thus, a gap 41 is held between a radially inner surface 35 of the magnetic core 23 and a radially outer surface 33 of the boss portion 27 but is preferably made enough narrow to make the magnetic flux jump over the gap 41 with minimum loss. Similarly, a gap 43 held between a radially outer surface 39 of the magnetic core 23 and a radially inner surface 37 of the first jacket portion 29 is preferably made sufficiently narrow.

Between the actuator 25 and the boss portion 27, a bearing 83 is interposed for the purpose of rotatable support. As the bearing 83, a ball bearing, a roller bearing, a needle bearing or such may be used.

The armature 19 made of any magnetic material is so disposed as to have plates 51, 55 of the pilot clutch 17 held between the armature 19 and the radial wall 9, thereby applying pressure to the plates 51, 55 when the solenoid 21 is excited.

Magnetic members composed of the magnetic core 23, the first jacket portion 29, the radial wall 9, the armature 19 and the boss portion 27 are so disposed to surround the solenoid 21 to induce the generated magnetic flux. Further, as the non-magnetic ring 40 magnetically separates the radial wall 9 into the inner and outer parts, a magnetic flux generated by the solenoid 21 makes a detour around the ring 40 and therefore passes through the armature 19 so that the armature 19 is attracted toward the solenoid 21. More specifically, the magnetic flux generated by the solenoid 21 forms a closed loop 50 through these magnetic members. Therefore the combination of the magnetic core 23, the first jacket portion 29, the radial wall 9, the armature 19 and the boss portion 27 functions as a closed magnetic circuit along the loop 50.

As these members around the solenoid 21 are mutually adjacent and further related in a way described above, the solenoid 21 can be disposed very close to the pilot clutch 17. Therefore the generated magnetic flux is effectively used for operating the pilot clutch 17. Further, the conical walls 10, 28 increase the magnetic path cross section, thereby further increasing efficiency of the magnetic flux. Of course, the conical walls 10, 28 are also advantageous in improvement of strength or stiffness of the structure.

Figure 3A:
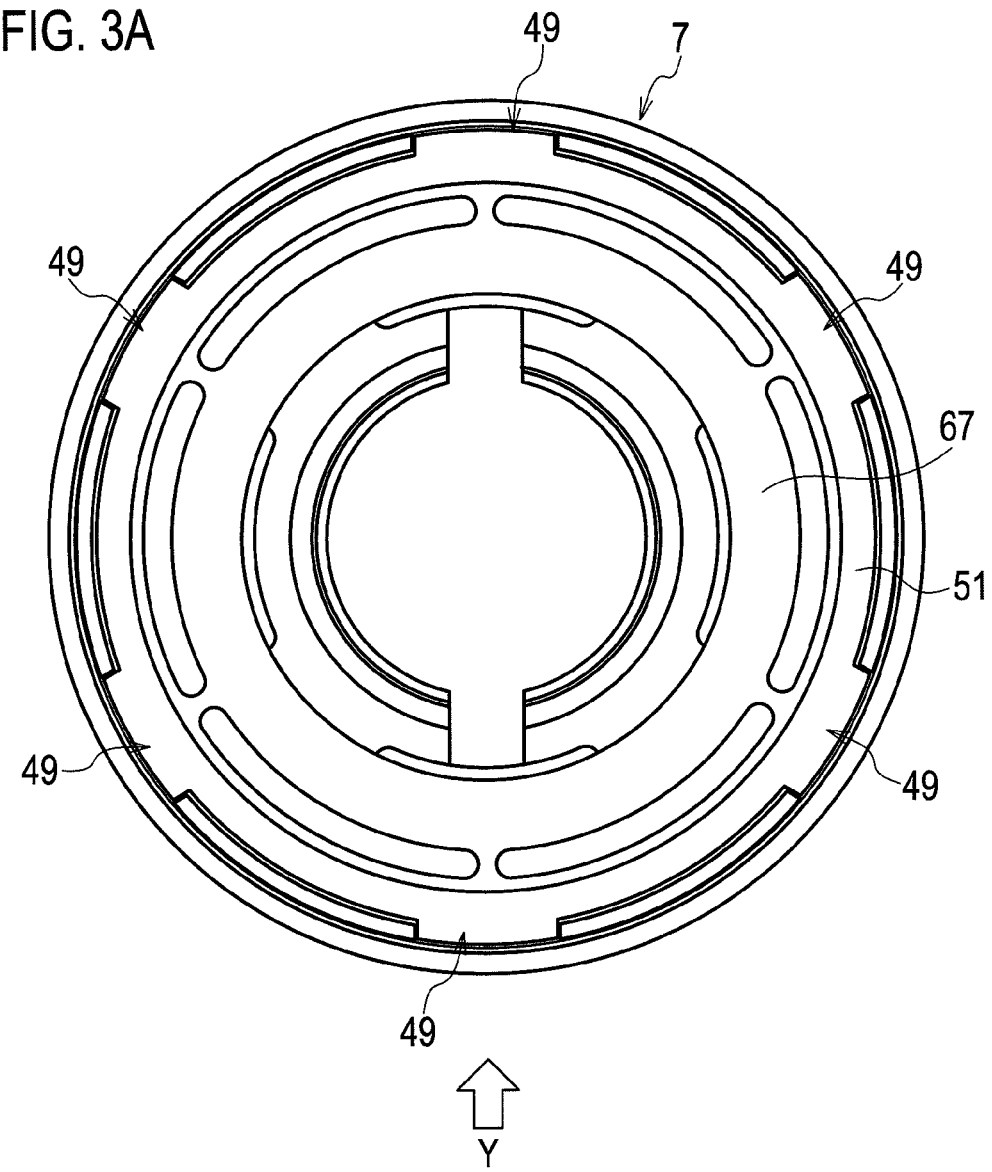
FIG. 3A is a side view of the first rotary member of FIG. 2A with outer plates of a main clutch and a pilot clutch installed therein.
Figure 3B:
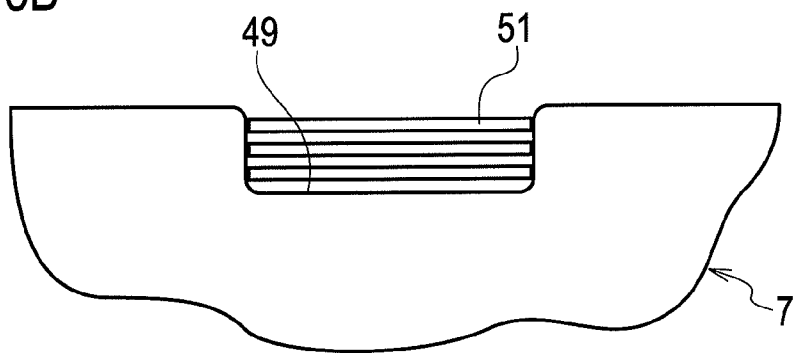
FIG. 3B is a plan view around the dog-teeth with the outer plates viewed along an arrow Y of FIG. 3A.

To the pilot clutch 17, a friction clutch such as a multi plate clutch may be applied. Outer plates 51 of the pilot clutch 17 respectively have radially projecting teeth to mate with the dog-teeth 49 of the first rotary member 7 as shown in FIGS. 3A and 3B, thereby drivingly engaging with the first rotary member 7, although the outer plates 51 are movable in the axial direction. Inner plates 55 of the pilot clutch 17 are splined for drivingly engaging with the cam mechanism 61. Consequently, the pilot clutch 17 frictionally transmits the torque to the cam mechanism 61 of the internal rotary member 15 when pressure is applied by the actuator 25.

The cam mechanism 61 is comprised of a cam ring 57, a pressure member 59, and a cam ball 91 held between the cam ring 57 and the pressure member 59 to operate the main clutch 53. The cam ring 57 is splined for drivingly engaging with the inner plates 55 of the pilot clutch 17 to receive the torque. As the cam ring 57 receives the torque via the pilot clutch 17 when operated, a difference in rotation between the cam ring 57 and the pressure member 59 induces axial fore in the cam ball 91 thereby converting a part of the torque into axial force for driving the pressure member 59 toward the main clutch 53. A thrust bearing 89 is interposed between the cam ring 57 and the rotor 11, thereby receiving a reaction force of the cam mechanism 61.

The main clutch 53 is comprised of outer plates 67 and inner plates 81 alternately arranged with the outer plates 67 in line along the axis, thereby frictionally transmitting torque when the pressure is applied.

The internal rotary member 15, around its circumference, has splines projecting outward by which the inner plates 81 and the pressure member 59 are drivingly engaged with the internal rotary member 15. The inner surface of the internal rotary member 15 is splined to mate with the shaft, thereby transmitting the torque from the outer rotary member 13 via the internal rotary member 15 to the shaft. The internal rotary member 15 may further have a partition wall 79 in its interior for the purpose of oil sealing.

A bearing member 71 such as a ball bearing is held between the first rotary member 7 and the internal rotary member 15 to rotatably support the internal rotary member 15. Similarly, a bearing member 73 such as a sliding bearing and a bearing member 75 such as an X-ring are held between the second rotary member 11 and the internal rotary member 15. If the X-ring is applied to the bearing member 75, it contributes to oil sealing.

In accordance with the driving force transmitting device 1 structured as above, when current applied through the line 87 energizes the actuator 25, the armature 19 attracted by the actuator 25 applies pressure on the pilot clutch 17 to generate breaking force on the cam ring 57. Then torque applied to the outer rotary body 13 produces a difference in rotation between the cam ring 57 and the pressure member 59 and thereby the cam mechanism 61 converts a part of the torque into axial force to drive the pressure member 59 toward the main clutch 53. Consequently the main clutch 53 is engaged to transmit the torque to the shaft.

As the pilot clutch 17 can be made with a relatively large diameter and further the cam face of the dog-teeth 49 assists engagement of the pilot clutch 17, the pilot clutch can generate relatively large force. Moreover, the relatively large cross section of the magnetic circuit contributes to increase in magnetic force of the actuator 25 to drive the pilot clutch 17. As the main clutch 53 is used in combination with the pilot clutch 17, the device 1 can transmit larger torque as compared with a device including only one clutch. Whereas existing devices without these power-up factors require large diameters to transmit large torque, the device 1 with these power-up factors can be made in a compact shape with ability of transmitting relatively large torque.

Figure 4:
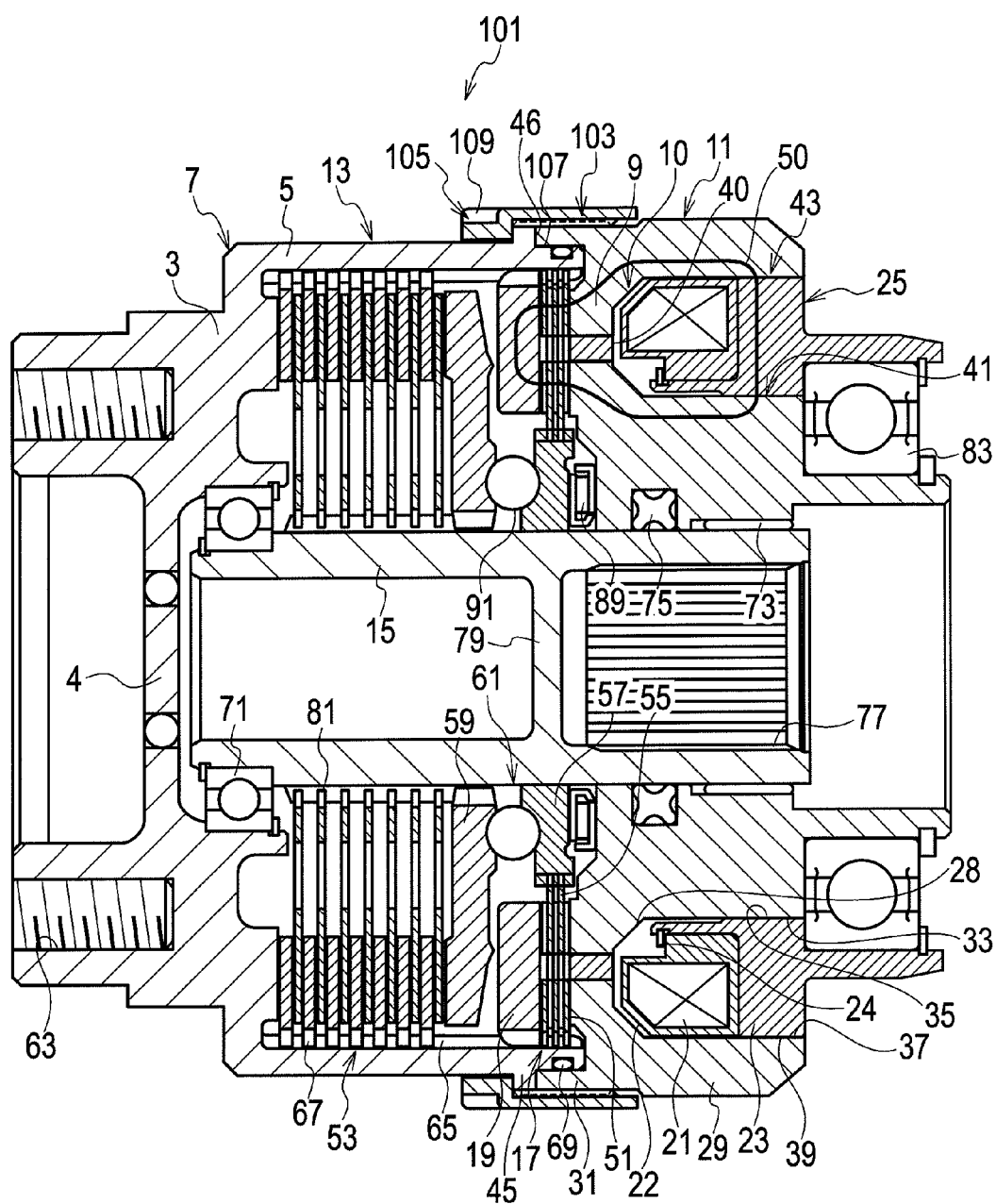
FIG. 4 is a cross sectional view of a driving force transmitting device according to a second embodiment of the present invention.

A second embodiment will be described hereinafter with reference to FIG. 4.

A driving force transmitting device 101 of the second embodiment is preferably used for various ways similar to those of the first embodiment. The driving force transmitting device 101 has a structure partially identical or similar to the aforementioned device 1 and therefore mainly only differences will be described.

In the driving force transmitting device 101, the first rotary member 7 and the second rotary member 11 are simply engaged with each other and both of them are tapped at 103 around the engaging portion. As the second rotary member 11 fits on the first rotary member 7 at a portion 107, these members are positioned radially in place. A circular projection 45, as with the first embodiment, positions these rotary members 7, 11 axially in place. A tapped retainer 105 is engaged with the tapped portion 103 of the rotary members 7,11 so that the rotary members 7,11 unitarily rotate. The retainer 103 has slots 109 with which a jig for installation can be engaged.

The dog-teeth 49 are formed independent of the splines 65. These diameters may be identical but, of course, may be differentiated as with the first embodiment.

The driving force transmitting device 101 in accordance with the second embodiment is advantageous in stable support between the first rotary member 7 and the second rotary member 11.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A driving force transmitting device used for transmission of torque to a shaft, comprising:
    a first rotary member including a cylindrical wall;
    a second rotary member being fixed with the first rotary member so as to define a housing chamber and including a radial wall, a boss portion axially projecting from the radial wall, a first jacket portion cylindrically extending from the radial wall, and a second jacket portion cylindrically extending opposite to the first jacket portion and being fit around the cylindrical wall, the first jacket portion in combination with the radial wall and the boss portion defines a solenoid housing hollow;
    a third rotary member rotatably supported in the first and second rotary members and drivingly engageable with the shaft;
    an anti-rotated actuator including a solenoid and a magnetic core disposed with a loose fit in the solenoid housing hollow;
    an armature housed in the housing chamber and disposed so that the armature, the radial wall, the boss portion, the core and the first jacket portion form a closed magnetic circuit around the solenoid; and
    a friction clutch held between the armature and the radial wall so as to frictionally transmit the torque between the first rotary member and the third rotary member,
    wherein the cylindrical wall comprises a fixed projection abutting on an end of the second jacket portion to prevent axial dislocation of the second rotary member.

2. The driving force transmitting device of claim 1, wherein the second rotary member includes a conical wall linking the first jacket portion with the radial wall, and the solenoid includes a conical outer face facing to the conical wall.

3. The driving force transmitting device of claim 2, wherein the second rotary member include a second conical wall linking the radial wall with the boss portion.

4. The driving force transmitting device of claim 1, wherein the second rotary member includes a second conical wall linking the radial wall with the boss portion.

5. The driving force transmitting device of claim 1, wherein the first jacket portion has a greater diameter than a contact face between the second jacket portion and the cylindrical wall.

6. The driving force transmitting device of claim 1, wherein the cylindrical wall comprises teeth for drivingly engaging with the friction clutch.

7. The driving force transmitting device of claim 1, wherein the third rotary member comprises a main clutch configured to engage with the first rotary member, and a cam mechanism configured to convert the torque transmitted via the friction clutch into axial force to drive the main clutch.

8. A driving force transmitting device used for transmission of torque to a shaft, comprising:
   a first rotary member including a cylindrical wall;
   a second rotary member being fixed with the first rotary member so as to define a housing chamber and including a radial wall, a boss portion axially projecting from the radial wall, a first jacket portion cylindrically extending from the radial wall, and a second jacket portion cylindrically extending opposite to the first jacket portion and being fit around the cylindrical wall, the first jacket portion in combination with the radial wall and the boss portion defines a solenoid housing hollow;
   a third rotary member rotatably supported in the first and second rotary members and drivingly engageable with the shaft;
   an anti-rotated actuator including a solenoid and a magnetic core disposed with a loose fit in the solenoid housing hollow;
   an armature housed in the housing chamber and disposed so that the armature, the radial wall, the boss portion, the core and the first jacket portion form a closed magnetic circuit around the solenoid; and
   a friction clutch held between the armature and the radial wall so as to frictionally transmit the torque between the first rotary member and the third rotary member,
   wherein the first jacket portion is totally exposed out of the first rotary member and covers a radially outer face of the solenoid.

9. The driving force transmitting device of claim 8, wherein the cylindrical wall comprises a projection abutting on an end of the second jacket portion.

10. The driving force transmitting device of claim 8, wherein the second rotary member includes a conical wall linking the first jacket portion with the radial wall, and the solenoid includes a conical outer face facing to the conical wall.

11. The driving force transmitting device of claim 10, wherein the second rotary member include a second conical wall linking the radial wall with the boss portion.

12. The driving force transmitting device of claim 8, wherein the second rotary member includes a second conical wall linking the radial wall with the boss portion.

13. The driving force transmitting device of claim 8, wherein the first jacket portion has a greater diameter than a contact face between the second jacket portion and the cylindrical wall.

14. The driving force transmitting device of claim 8, wherein the cylindrical wall comprises teeth for drivingly engaging with the friction clutch.

15. The driving force transmitting device of claim 8, wherein the third rotary member comprises a main clutch configured to engage with the first rotary member, and a cam mechanism configured to convert the torque transmitted via the friction clutch into axial force to drive the main clutch.

* * * * *